March 21, 1967 J. A. STANDRIDGE ET AL 3,310,019
FLOATS
Filed June 18, 1965

INVENTORS
J. A. STANDRIDGE
B.D. NICHOLSON
BY
Young + Quigg
ATTORNEYS

United States Patent Office 3,310,019
Patented Mar. 21, 1967

3,310,019
FLOATS
James A. Standridge and Brian D. Nicholson, Lafayette, La., assignors to Phillips Petroleum Company, a corporation of Delaware
Filed June 18, 1965, Ser. No. 465,074
2 Claims. (Cl. 114—235)

This invention relates to a method and an apparatus for maintaining on substantially the desired course an elongated and/or flexible member being towed through a fluid. In one aspect, this invention relates to a method and apparatus for substantially reducing the lateral drift of a cable, e.g. a seismic cable, as it is towed through water.

Although this invention will, for the sake of clarity, be described relative to a specific application of the invention of towing seismic cables through water, it is to be understood at the outset that this invention is broadly applicable to the pulling of any member through a fluid which is subject to lateral drifting, i.e. movement in a direction somewhat or substantially perpendicular to the direction in which the member is being towed.

In water borne seismic exploration, an electrical cable, hereinafter referred to as a seismic cable, is pulled through the water by a boat over a precise path of travel. The path of travel of the seismic cable must be very precise so that seismic signals generated by detonation of an explosive at predetermined points will be reflected from the substratum which it is desired to investigate and the reflected seismic waves are picked up by geophones carried by the seismic cable. The geophones transmit electrical impulses through the seismic cable to the towing boat which has various apparatus for recording same for subsequent study. If the towing boat does not pull the seismic cable over the precise path laid out for that cable, no charges can be detonated because the reliability of the results depends upon the specific spatial relationship of the geophones and detonated charge with respect to the substratum under investigation. Similarly, if, due to various natural vagrancies, such as the vagrancies of the currents in a large body of water, the seismic cable is laterally displaced from the precise path of travel laid out for that cable, the charges cannot be detonated on that trip. If the charges cannot be detonated then the towing boat must circle around and attempt to pull the seismic cable over that same path. Since the normal seismic cable is extremely long, i.e. upwards of 8000 to 10,000 or more feet, it takes approximately 1½ hours to complete a circle. This represents a very substantial amount of lost time and introduces a substantial adverse economic factor into such operations. In some cases as much as a full month's production out of a 5 month period has been lost and the loss traced directly to the need for repetitive circling of the boat and its towed seismic cable to get that cable onto the required line of travel.

It has now been found that the lateral drift of a towed, seismic cable can be substantially reduced and that cable kept substantially on course in a substantially straight line by the use of a float apparatus comprising a frame and at least two fluid deflection means or rudders which are rotatably carried by said frame and adapted to be rotated in a direction which opposes currents in the water in which the seismic cable is towed, which currents tend to cause lateral drift of that seismic cable. The float of this invention is attached in any known and conventional manner to the seismic cable at any desired point along the length thereof, preferably at an intermediate point. One or as many as desired floats can be employed on a single cable at spaced intermediate or terminal points along the range of the cable.

The method of this invention involves employing in an attached relationship at least one float of this invention at at least one point along the length of at least one cable.

It is an object of this invention to provide a new and improved method and apparatus for maintaining a towed member which is subject to lateral drifting on course. Another object relates to a method and apparatus for substantially reducing the lateral drifting of a towed seismic cable.

Other aspects, objects, and the several advantages of this invention will be apparent to those skilled in the art from the description, the drawing, and the appended claims.

Figure 1:
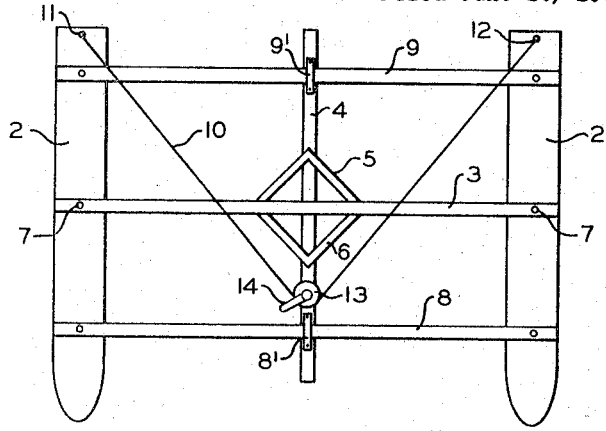
FIGURE 1 shows a plan view of a float embodying this invention.

In FIGURE 1 there is shown a frame comprising two spaced apart floats 2, 2 which are maintained in a spaced apart relation by support member 3 which in turn is both fixed to support 4 at the area in which they cross and braced to support 4 by members 5 and 6. The points of attachment 7, 7 between member 3 and floats 2, 2 is rotatable so that floats 2, 2 can rotate in a substantially horizontal plane below member 3.

Floats 2, 2 are maintained in a substantially parallel relationship by movable supports 8 and 9 which are also rotatably attached to floats 2, 2 but are not attached to member 4. Members 8 and 9 have free bi-directional movement in a horizontal plane over member 4 which movement is limited by keepers 8' and 9'. Thus, supports 8 and 9 slide both along longitudinal axis of support 4 and across that axis as floats 2, 2 rotate.

The rotation of floats 2, 2 is effected by flexible line 10 which is attached at points 11 and 12 to floats 2, 2 and which is wrapped around circular member 13 several times so that sufficient friction is generated between the outer surface of 13 and line 10 to cause rotation of floats 2, 2 when 13 is rotated. Circular member 13 is rotatably attached to member 4 and has a handle 14 fixed thereto for rotating same. Member 13 preferably has a conventional locking means associated therewith so that it can be locked in any desired rotated or straight-ahead position, thereby fixing floats 2, 2 in the related position caused by the rotation of member 13. Any type of locking means well known to those skilled in the art can be employed. For example, a double ratchet and double pawl system can be employed so that whether member 13 is rotated in a clockwise or counterclockwise position there is a pawl associated with a ratchet which will lock member 13 in that position and resist the tendency of the floats 2, 2 to rotate back to the position which is shown in FIGURE 1 or to rotate further away from the position shown in FIGURE 1 when the entire float is pulled through the water.

It should be noted that although the rotation of floats 2, 2 is disclosed to be manual, rotation and therefore orientation relative to lateral currents of floats 2, 2 can be effected automatically by utilizing a motor to rotate circular member 13 and the rotation of circular member 13 by a motor or other suitable means can be effected remotely from the towing boat. Also, suitable conventional current sensing means can be attached to floats 2, 2 to sense changes in the directional flow of lateral currents which sensed changes can be transmitted to the towing boat and suitable rotation of the floats 2, 2 effected remotely from the towing boat. In the alternative, the required change in rotation due to the sensed changes can be automatically computed and the computer or other suitable control means can then automatically adjust the degree of rotation of floats 2, 2 by action on member 13 thereby automatically compensating for the lateral current changes. If desired, other mechanical locking means can be employed to maintain floats 2, 2 in a rotated position, for example, a locking means acting between members 8 or 9 or both and member 4 can be employed. Similarly, resilient or sliding and rotatable bracing means can be employed which are mounted between members 3, 8 or 9 and floats 2, 2 so long as such braces do not interfere with the rotation of the floats.

Figure 2:
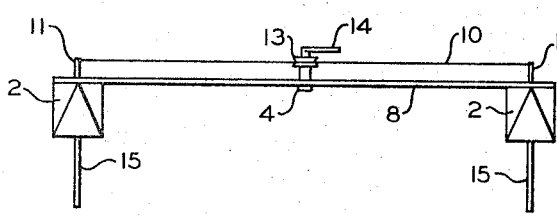
FIGURE 2 is a front elevation of the float of FIGURE 1.

In FIGURE 2 the parallel and spaced apart fluid deflection or rudder means 15 can be seen as attached to the bottoms of floats 2, 2. The seismic cable is attached to any suitable member of the over-all float such as support member 4. Any conventional type of fastening means, i.e., a U-bolt with a curved portion extending downwardly into the water, well known to those skilled in the art can be employed to attach the seismic cable to the overall-float.

Figure 3:
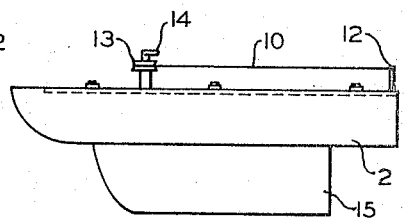
FIGURE 3 is a side elevation of the float of FIGURE 1.

FIGURE 3 shows a side view of a suitable rudder 15 as attached to the bottom of float 2. It should be noted that the configuration length, thickness, and height of rudder 15 can vary widely depending upon the circumstances in which it is to be employed. Rudders of both larger and smaller side area (shown in FIGURE 3) or any conventional configuration can be employed if desired.

Figure 4:
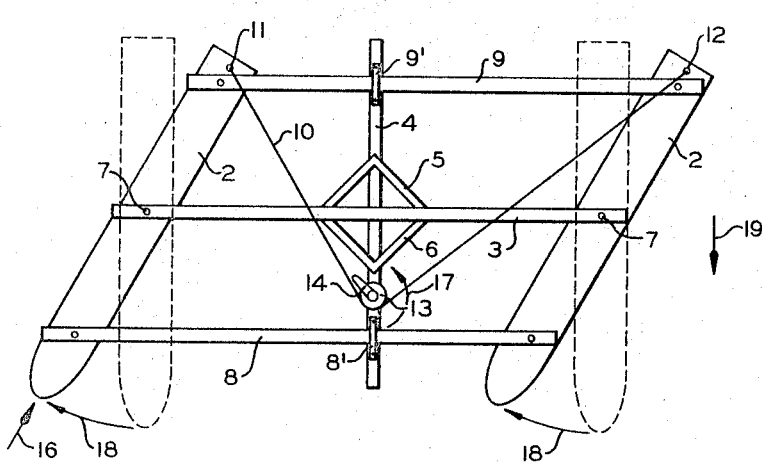
FIGURE 4 is a plan view of the float of FIGURE 1 in a rotated position.

FIGURE 4 shows the float of FIGURE 1 rotated from its normal straightforward position (shown in dotted lines) to the position necessary to meet a current which is flowing in the direction of arrow 16 and which would tend to cause lateral drift of the towed seismic cable. Circular member 13 is rotated in the direction of arrow 17 to obtain the angle of rotation of floats 2, 2 indicated by arrows 18, 18. The direction in which the seismic cable and the float is towed in FIGURE 4 is indicated by arrow 19. Thus, it can be seen that suitable rotation of member 13 in either direction will cause rotation of floats 2, 2 to head into and oppose the direction of a lateral type current which would normally cause lateral drift of the seismic cable. By this opposition of the lateral type current, the seismic cable is kept substantially on course in a substantially straight line and the lateral drift of that cable is thereby substantially reduced. The amount of reduction of the lateral drift depends upon the number of float devices employed and how well floats 2, 2 can be brought into an opposing position relative to the lateral type current.

Reasonable variations and modifications of this invention can be made or followed in view of the foregoing, without departing from the spirit or scope thereof.

We claim:

1. Apparatus for substantially reducing lateral drifting of a towed seismic cable containing a frame means carrying a fixed cross member and two bidirectionally freely slidable cross member disposed on opposite sides of said fixed cross member, at least two float means rotatably attached to each of said fixed and freely slidable cross members, rudder means attached to the bottom of each of said float means, a rotatable means carried by said frame means substantially centrally between said at least two float means, a cable means attached to said float means and wound about said rotatable means, said cable means being attached to said float means in a manner such that rotation of said rotatable means causes substantially simultaneous rotation of said float means, thereby orienting same in substantially the same direction, and means for fixedly attaching a seismic cable to said frame means.

2. Apparatus for maintaining a towed member substantially on course comprising a frame means carrying a fixed cross member and at least one bidirectionally freely slidable cross member disposed on at least one side of said fixed cross member, at least two float means rotatably attached to each of said fixed and freely slidable cross members, rudder means carried on each of said float means, a rotatable means carried by at least one of said frame means and said fixed cross member between said at least two float means, a flexible means attached to said float means and carried by said rotatable means, said flexible means being attached to said float means in a manner such that rotation of said rotatable means causes rotation of said float means in substantially the same direction, and means for attaching said towed member to said frame means.

References Cited by the Examiner

UNITED STATES PATENTS

| | | | |
|---|---|---|---|
| 67,846 | 8/1867 | Cayce | 114—123 X |
| 831,636 | 9/1906 | Suhm et al. | 114—39 |
| 1,678,023 | 7/1928 | Stites | 114—123 |
| 3,145,030 | 8/1964 | Millis | 114—235 X |

MILTON BUCHLER, *Primary Examiner.*

FERGUS S. MIDDLETON, *Examiner.*

T. M. BLIX, *Assistant Examiner.*